United States Patent [19]

Wright

[11] Patent Number: 4,626,218

[45] Date of Patent: Dec. 2, 1986

[54] MODULAR FURNITURE DESIGN AID

[76] Inventor: Charles W. Wright, 3725 Blackstone Ave., Riverdale, N.Y. 10463

[21] Appl. No.: 750,742

[22] Filed: Jul. 1, 1985

[51] Int. Cl.⁴ ............................................. G09B 25/04
[52] U.S. Cl. ........................................ 434/73; 434/80
[58] Field of Search ...................... 434/73, 79, 80, 84

[56] References Cited

U.S. PATENT DOCUMENTS

| 1,845,240 | 2/1932 | Cook | 434/80 |
| 2,528,211 | 10/1950 | Civkin | 434/80 |
| 2,984,020 | 5/1961 | Levitas | 434/80 |
| 4,135,315 | 1/1979 | McKee | 434/80 X |

FOREIGN PATENT DOCUMENTS 680173  10/1952  United Kingdom ................. 434/81

Primary Examiner—Harland S. Skogquist
Attorney, Agent, or Firm—Richard L. Miller

[57] ABSTRACT

Disclosed is a knock down kit of miniature walls and miniature modular furniture items magnetically attachable together and including a rubber stamp face printing mechanism on each face miniature modular furniture items in the kit so as to facilitate the making of scale drawings of the layout of a room.

3 Claims, 5 Drawing Figures

U.S. Patent  Dec. 2, 1986  4,626,218
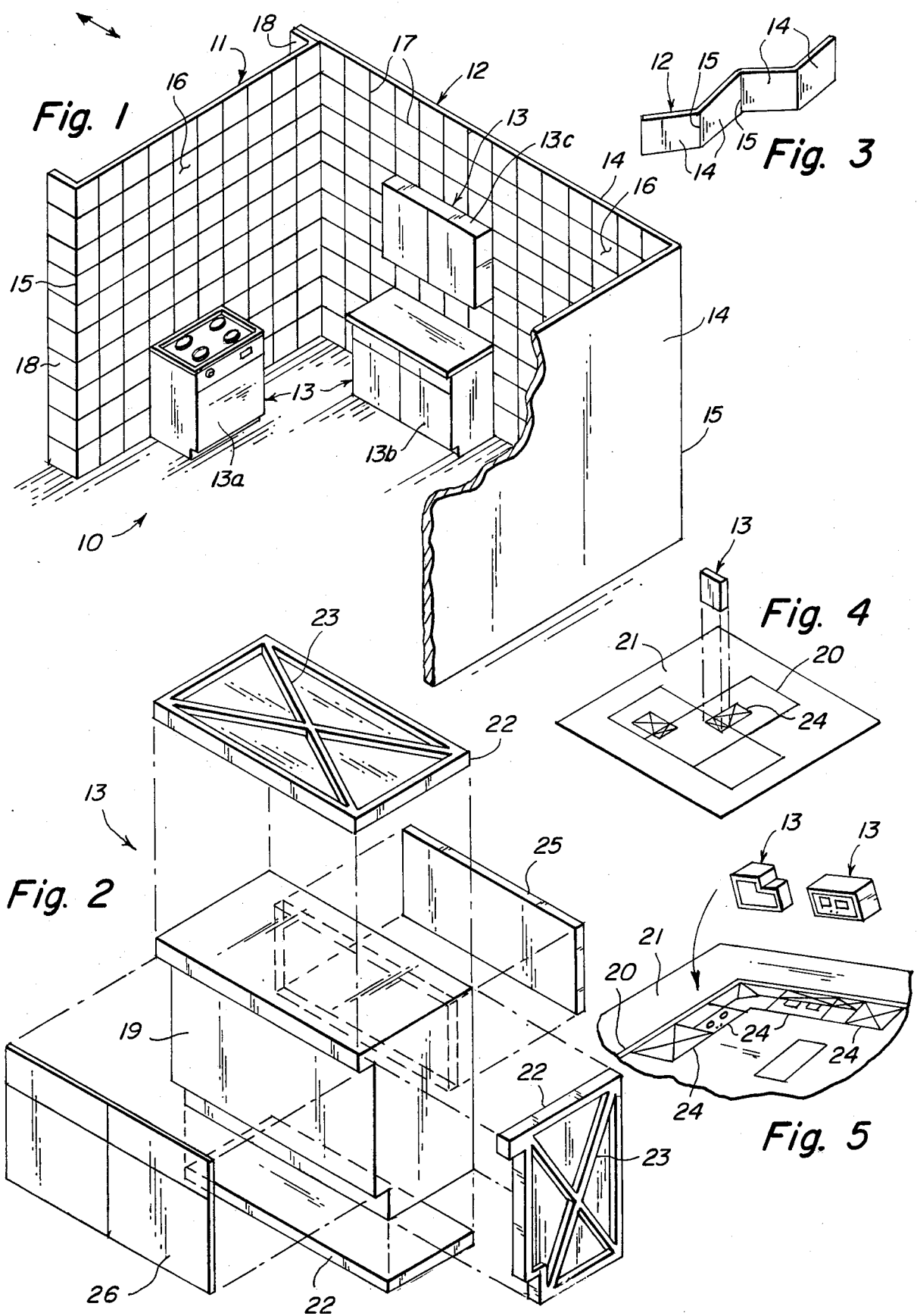

4,626,218

MODULAR FURNITURE DESIGN AID

BACKGROUND OF THE INVENTION

This inventor relates generally to architectural planning equipment. More specifically it relates to instruments used in laying out stationary installed modular furniture such as kitchen cabinets, sinks, tub and the like, and in an improvement over the architectural planning equipment that is presented in U.S. Pat. Nos. 1,845,240; 2,127,047; 2,317,124; 2,878,586; 2,941,314; and 3,603,004, all of which serve only to display three dimensionally various layouts.

It is well known that before heavy, large or permanently located furniture or equipment is installed, careful planning is done so that a most ideal location is found for all users thereof. Various kits have accordingly been designed in the past wherein miniature pieces, each representing a different furniture item, may be easily and conveniently shifted about upon a table top or the like until a most perfect layout is found; the above indicated patents presenting some of such kits. However each of these kits produce only a momentary presentation which afterwards is broken up when the kit is put away or used for other presentations, so that in order to record the ideal layout before break up, it is necessary to first copy the kit layout on a paper which can be done by anyone who can draw. This may take a bit of time to do accurately so that this situation is accordingly in need of an improvement.

SUMMARY OF THE INVENTION

Therefore it is a principal object of the present inventor to provide a kit which, in addition to presenting a momentary three dimensional layout for an instant demonstration, also includes a means for quickly and easily copy the layout on a paper for further or future consideration.

Another object is to provide a modular furniture design aid for use by designer, architects and builders when sitting down with a customer to discuss layouts, and which can accomplish all possibilities in a single meeting with the same ease as shifting playing pieces on a checker board.

Another object is to provide a modular furniture design aid for use in laying out a commercial plant, an office or a room of a house, such as a kitchen or the like.

Other objects are to provide a modular furniture design aid which can be made to fit comfortably into an attache case, saves hours of costly time by eliminating need of concept drawings, and redraftings due to client indecision and changes which are inexpensive.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention with parts broken away.

FIG. 2 is an enlarged exploded perspective view of one of the typical miniature kitchen pieces of furniture.

FIG. 3 is a perspective view illustrating how the wall may be folded when desired.

FIG. 4 and 5, are typical pieces of furniture being used to hand stamp a kitchen layout drawing plan.

DETAILED DESCRIPTION OF THE PREFERRED EMBODIMENTS

Referring now to the Drawing in greater detail, the reference numeral 10 represents a modular furniture design aid, according to the present inventon which comprises a kit that could be made portable by being stored in an attache case when disassembled. The kit consists of a plurality of wall pieces 11 and 12 and also a large assortment of furniture pieces 13 such as are shown by the few examples 13a to 13c illustrated in the drawing. The wall pieces serve to form scaled down representations of walls of an actual room and the furniture pieces serve to represent scaled down furnishings for selective installation in the room. For most practical use, all items may be scaled so that each one-half inch thereof represents an actual one foot. However the kit may be also manufactured on other scale sizes measured in either metric or inch and foot systems.

Each wall piece comprises a strip of several stiff panels 14 pivotable about a fold line 15 therebetween so to fit in the attache case when stored, and to stand upright in use. The inner side 16 is preferably made of sheet steel so as to be magnetically attractive and the surface is marked with vertical and horizontal lines 17 spaced apart so as to represent one foot therebetween. As shown in FIG. 1, tabs 18 on piece 11 serve as tabs for magnetic attachment at selected location of piece 12 and form any desired size of a room.

Each furniture piece 13 comprises a block 19 of any material containing a permanent magnet 25 for adhering to the wall pieces. Each furniture piece may be shaped and decorated by having a removable front face 26 so as to look like specific modular furniture item, such as for example: a range 13a, a base cabinet 13b, wall cabinet 13c, and the like.

In the present invention each furniture piece is made so as to serve as a rubber stamp for stamping its outline and appearance upon a plan 20 drawn upon a sheet of paper 21. Accordingly various sides of the piece may be made to comprise panels 22 removably adhered to the block 19 either magnetically or by means of VEL-CRO ® loop pile fasteners. When a panel 22 is removed, it is made to be reversible and similarly held thereto so as to expose a raised rubber stamping face 23. In use, the stamping face prints the location and precise size of the furniture piece upon the plan 20, as shown by the stamp print 24.

It is to be noted that in general all six faces of a typical piece of miniature modular furniture have stamping faces incorporated thereon so that depending upon the nature of the drawing print requirement, that is a plan view of a room, or an elevational view of a particular wall, there will be available a scale stamp as required of all views of each piece of furniture.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A modular furniture design aid, comprising, in combination, a kit including a plurality of miniature wall pieces and a plurality of modular furniture pieces for selective assembly together, a permanent magnet in each said furniture piece, and a steel face on each said wall piece for detachable attachment together; and printing means by each of said furniture pieces.

2. The combination as set forth in claim 1, wherein each said wall piece is marked with a plurality of vertical and horizontal lines representing set linear distances apart.

3. The combination as set forth in claim 2, wherein each said furniture piece is specifically sized to a linear scale matching said set linear distances on said walls.

* * * * *